United States Patent [19]

Tashman

[11] Patent Number: 4,765,440

[45] Date of Patent: Aug. 23, 1988

[54] FOOD SERVICE CONVEYOR

[76] Inventor: Philip Tashman, 11020 SW. 75th Ct., Miami, Fla. 33156

[21] Appl. No.: 67,275

[22] Filed: Jun. 29, 1987

[51] Int. Cl.$^4$ .......................... B65G 15/02; E04H 3/04
[52] U.S. Cl. ........................................ 186/44; 186/49; 198/793; 198/841
[58] Field of Search .................. 186/40, 50, 44–46, 186/49, 34; 198/793, 841, 851; 211/121, 122; 108/22; 312/140.1, 140.2, 250

[56] References Cited

U.S. PATENT DOCUMENTS

| | | | |
|---|---|---|---|
| Re. 29,767 | 9/1978 | Futch | 186/44 |
| 1,992,861 | 2/1935 | Demos | 186/46 |
| 2,342,468 | 2/1944 | Hallwood | 198/793 |
| 2,737,288 | 3/1956 | Boots et al. | 198/851 X |
| 2,866,537 | 12/1958 | Immesberger | 198/793 |
| 3,348,661 | 10/1967 | Brautovich | 198/793 |
| 3,874,479 | 4/1975 | Onori et al. | 186/44 |
| 4,216,845 | 8/1980 | Tashman et al. | 186/49 |
| 4,223,781 | 9/1980 | Beezer | 198/841 X |
| 4,562,921 | 1/1986 | Leemkuil et al. | 198/841 |
| 4,664,036 | 5/1987 | Hajcak, Jr. | 198/841 X |

Primary Examiner—Kevin P. Shaver
Attorney, Agent, or Firm—J. Sanchelima

[57] ABSTRACT

A food service electrically driven conveyor having a substantially rectangular table with a flat top and a sprocket chain disposed in a continuous loop parallel to it. The chain is trained over sprockets of relatively small diameter located at each end of the table. Several trays are carried around the path outside the loop by means of a self-lubricating sliding block that rides on a rail member that is contiguous to the chain loop. Pivotally mounted arm members on the block pivotally connect to different link members of the chain.

4 Claims, 4 Drawing Sheets

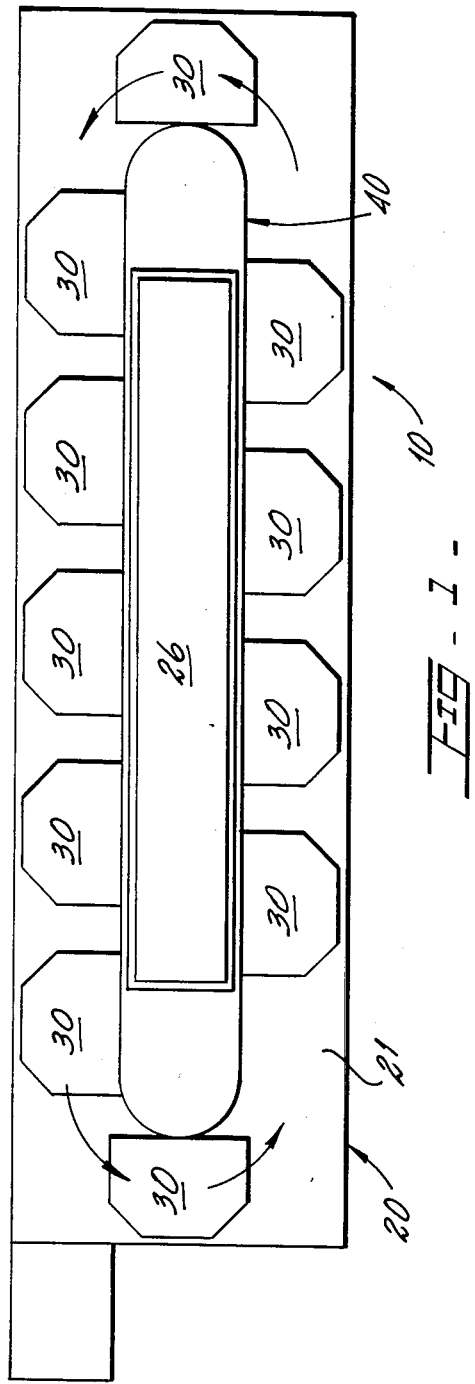
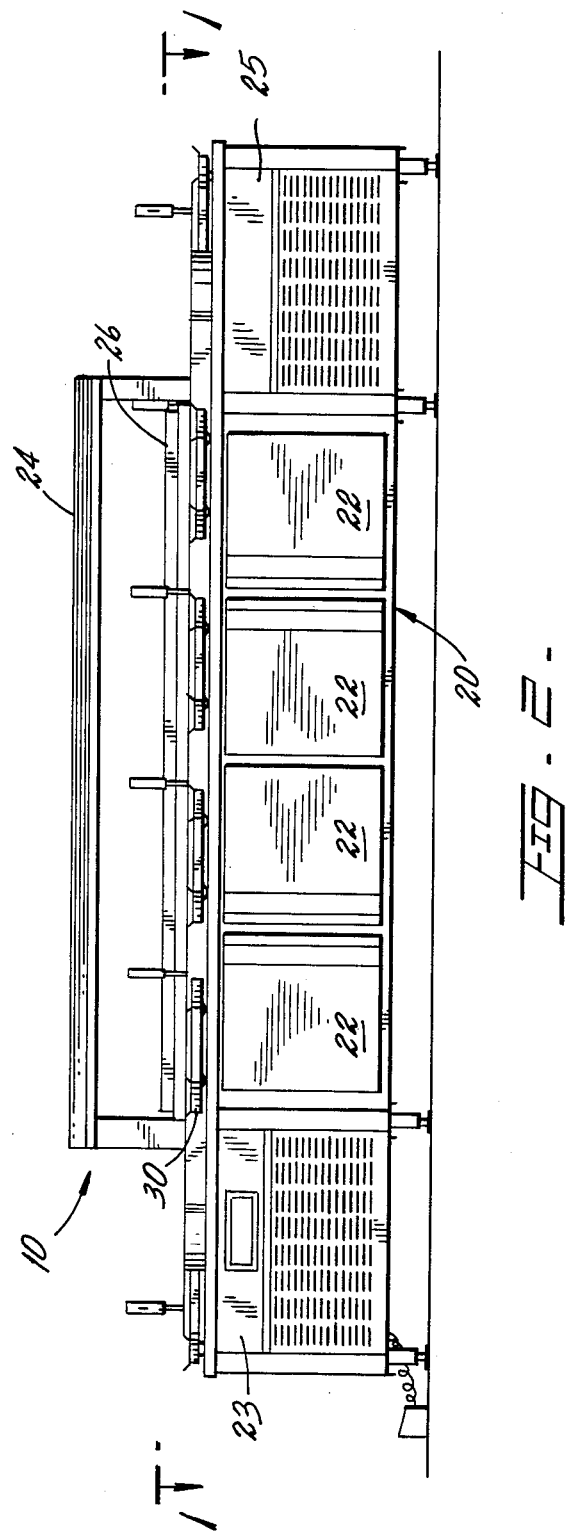

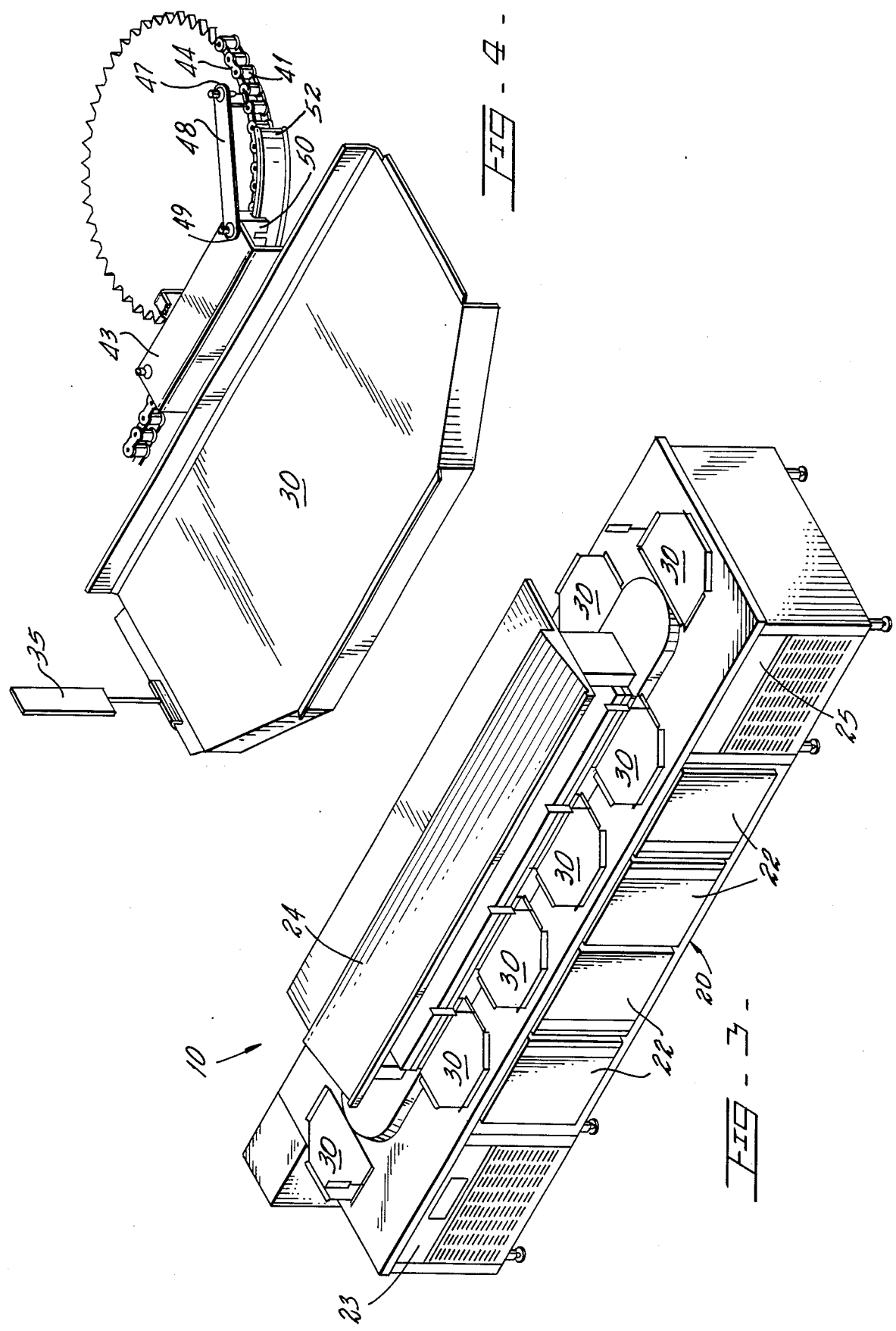

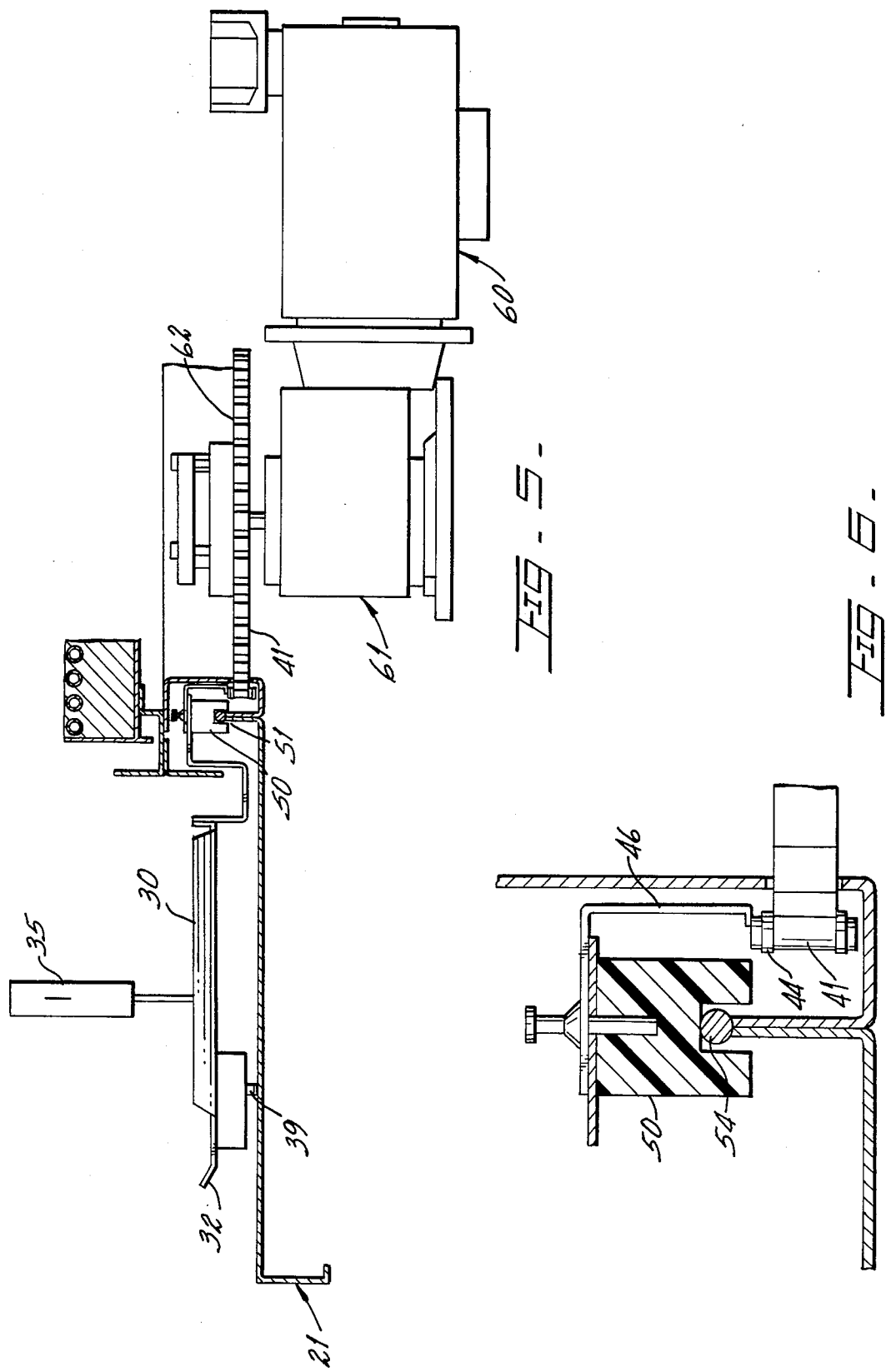

FOOD SERVICE CONVEYOR

BACKGROUND OF THE INVENTION

1. Field of the Invention

The present invention relates to a food service conveyor, and more particularly, to such conveyors that include a plurality of trays that are filled by operators positioned around the periphery of the conveyor.

2. Description of the Related Art

Several conveyors have been designed and used in the past to mechanise the transportation of food products through conveyor systems mounted on tables. These conveyors are usually circular or endless conveyors and they require a minimum radius of curvature at the turning points. This characteristic causes a dead space on the middle section of the conveyor that is usually mounted on top of a table or other assembly. The greater the radius of curvature of the conveyor the more inaccessible the middle section is to the operators.

One of these conveyor designs is disclosed in U.S. Pat. No. 4,216,845 issued on Aug. 12, 1980 to Tashman and Onorl. The former being the inventor and applicant of the present application. In this patent the conveyor is mounted on an elongated rectangular table top over which an articulated slat conveyor belt is driven through a circular tracking slot. It is inherent in the design of this type of conveyor that, unless the trays are made very narrow, the radius of curvature at the turning points create a useless island on the middle of the table.

Another attempt to provide a space efficient apparatus for use in assembling food on trays is disclosed in U.S. reissue Pat. No. 29,767 which was originally issued as U.S. Pat. No. 3,926,489 on Dec. 16, 1975 to Futch.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a food service conveyor that is volumetrically efficient and requires a minimum radius of curvature at its turning points.

It is another object of this present invention to provide a food service conveyor that includes a self-lubricating guiding mechanism for the trays being transported.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a top view of the food service conveyor subject of the present application.

FIG. 2 shows an elevational side view of the conveyor.

FIG. 3 illustrates a view in perspective of the conveyor.

FIG. 4 is an enlarged view of the tray as it approaches the end of the conveyor.

FIG. 5 is an elevational end view of the internal sprocket chain mechanism and tray traveling over the table top.

FIG. 6 is a cross-section view of the sliding block and associated driving component.

DETAILED DESCRIPTION OF THE PREFERRED EMBODIMENT

Figure 7:
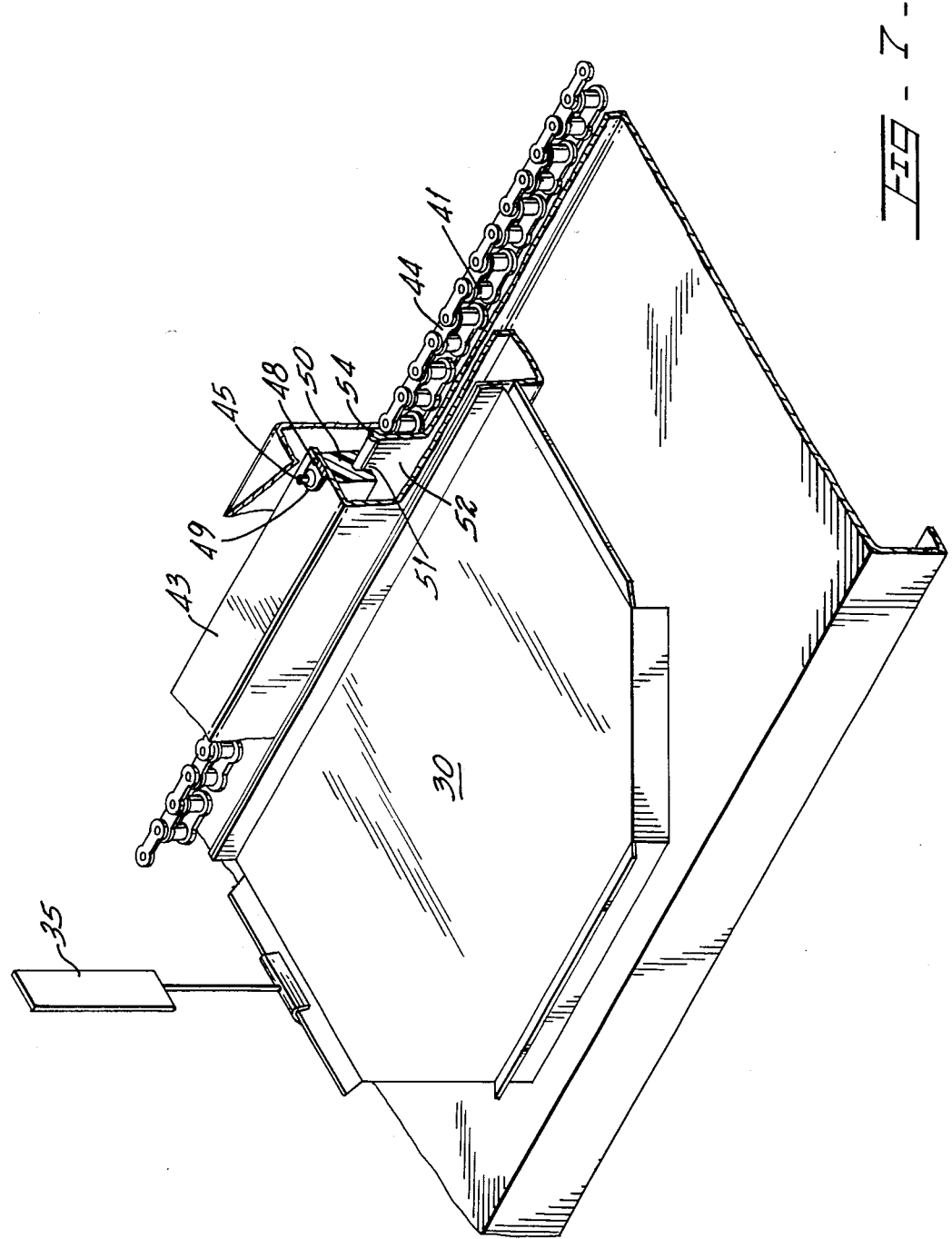
FIG. 7 shows a view in perspective of tray traveling on the table top with a partially broken section showing the sliding block and associated driving components.

Referring now to FIGS. 1 and 2 where the present invention is generally referred to with numeral 10, it can be seen that it basically includes a substantially rectangular table assembly 20 with a plurality of refrigerated compartments 22 for food storage, shelf assemblies 24 and 26, tray assemblies 30, spaced apart pedestals 23 and 25 and conveyor assembly 40.

As in other conventional food service conveyors, electrical motor means 60 and step down gear assembly 61 with suitable switches and circuits are used to provide the necessary rotational energy to a sprocket chain 41 that travels in a plane that is parallel to table top 21, as shown in FIG. 5. Chain 41 forms a continuous loop along table top 21. At the ends of the loop, chain 41 is trained over small diameter sprocket members 62 (only one shown). In contrast with other conventional systems, however, the conveyor assembly 40 in this invention is capable of following a relatively small radius of curvature at the ends of the track thereby contributing to its volumetric efficiency. As shown in FIG. 5, motor means 60, with the appropriate step down device 61, provides rotational movement to sprocket member 62 which in turn moves chain 41. As best seen from FIGS. 4; 6 and 7, chain link 44 has inverted L-shape post member 46 rigidly mounted thereon. Arm member 48 is pivotally mounted to post member 46 on one end 47 and the other end 49 of member 48 is pivotally mounted to the top surface of sliding block 50 which is preferably made out of a self-lubrication plastic material such as Delrin. Block 50 includes a longitudinal aperture 51 that houses a low friction tubular member 54 which is rigidly mounted over rail member 52.

Tray assembly 30 is rigidly connected to block 50 on its inner side and its outer side rests on roller 39. In the preferred embodiment a pin 45 is mounted through channel extension member 43 that is rigidly attached to the inner side of tray 30. Pin 45 is mounted to the upperside of block 50, allowing it to turn as shown in FIG. 4. Upwardly extending flanges 32 help keep the food items on tray assemblies 30. A menu identifier member 35 is shown in FIGS. 5 and 7 to be an upwardly extending member mounted to one of the sides of tray 30 to identify a particular tray for a predetermined combination of food items that it is to contain.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A food service conveyor apparatus comprising:
   A. a substantially rectangular table including a flat horizontal top member;
   B. a sprocket chain disposed in a continuous loop configuration in a plane parallel to said top member;
   C. electrical motor means for driving said sprocket chain;
   D. a continuous upwardly extending rail member mounted on said top member and outwardly located a constant spaced apart distance from said sprocket chain, said rail member further including a continuous low friction tubular member at its upper end;
   E. a plurality of sliding blocks having a longitudinal groove through their undersides that cooperatively rest on said rail member, and said blocks having uppersides;
   F. connecting means for connecting said blocks to said sprocket chain, said connecting means comprising inverted L-shaped post members rigidly mounted on one end to spaced apart locations on said sprocket chain and a plurality of arm members pivotally connected to the uppersides of said blocks, the other end of said post members extending outwardly from and parallel to said top member and being pivotally mounted to said arm members; and
   G. a plurality of tray members rigidly mounted to said blocks so that they are moved around the table when said electrical motor means is operated.

2. The conveyor set forth in claim 1 wherein said sliding block is made out of a self-lubricating material.

3. The conveyor set forth in claim 2 wherein said sliding block is made out of Delrin.

4. The conveyor set forth in claim 3 wherein said tray members include a bottom surface with at least one roller mounted to said bottom surface.

* * * * *